United States Patent
Visser

[11] Patent Number: 6,033,298
[45] Date of Patent: Mar. 7, 2000

[54] APPARATUS FOR FILLETING THE BREAST PIECE OF A SLAUGHTERED BIRD

[75] Inventor: Dirk Visser, Oostzaan, Netherlands

[73] Assignee: Machinefabriek Meyn B.V., Oostzaan, Netherlands

[21] Appl. No.: 09/014,821

[22] Filed: Jan. 28, 1998

[30] Foreign Application Priority Data

Jan. 28, 1997 [NL] Netherlands ............................ 1005107

[51] Int. Cl.⁷ ............................ A22C 17/04; A22C 21/00
[52] U.S. Cl. ........................ 452/136; 452/127; 452/165; 452/170
[58] Field of Search ..................... 452/136, 135, 452/127, 170, 165

[56] References Cited

U.S. PATENT DOCUMENTS

| | | | |
|---|---|---|---|
| 4,557,017 | 12/1985 | Gasbarro ................................. | 452/136 |
| 4,567,624 | 2/1986 | Van Mil . | |
| 4,682,386 | 7/1987 | Hazenbroek et al. . | |
| 4,873,746 | 10/1989 | Scheier et al. ........................... | 452/136 |
| 4,951,354 | 8/1990 | Callsen et al. ........................... | 452/136 |
| 4,993,114 | 2/1991 | Meyer et al. ............................ | 452/136 |
| 5,098,337 | 3/1992 | Landt et al. ............................. | 452/136 |
| 5,269,722 | 12/1993 | Diesing et al. .......................... | 452/135 |
| 5,372,539 | 12/1994 | Kunig et al. . | |
| 5,466,185 | 11/1995 | Martin et al. . | |
| 5,545,083 | 8/1996 | Bargelé et al. .......................... | 452/138 |

FOREIGN PATENT DOCUMENTS

| | | |
|---|---|---|
| 0591741A1 | 4/1994 | European Pat. Off. . |
| 8300907 | 10/1984 | Netherlands . |
| 8302494 | 2/1985 | Netherlands . |
| 1000935 | 4/1997 | Netherlands . |

*Primary Examiner*—Willis Little
*Attorney, Agent, or Firm*—Dority & Manning

[57] ABSTRACT

The invention relates to an apparatus for filleting the breast piece of a slaughtered bird having a conveyor for the breast piece and filleting devices positioned alongside the conveyor. The filleting devices comprise scraping plates having an operative contour adapted to the shape of part of the breast piece to be processed. It is possible to provide scraping plates extending substantially perpendicularly to the longitudinal medial plane of the conveyor and/or scraping plates extending substantially in parallel with the longitudinal medial plane of the conveyor.

10 Claims, 1 Drawing Sheet

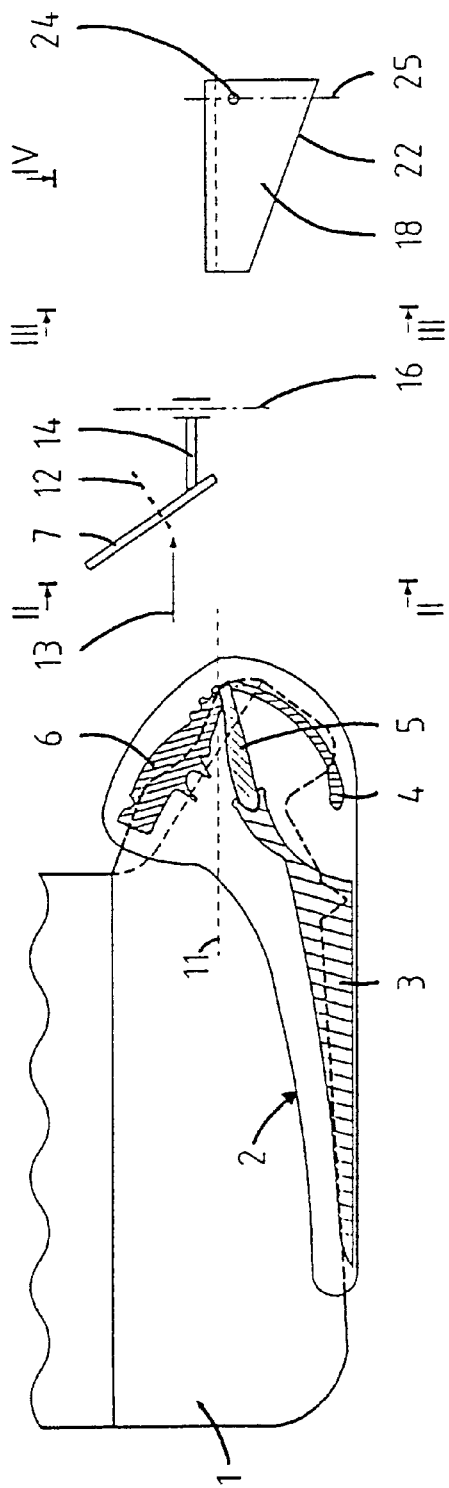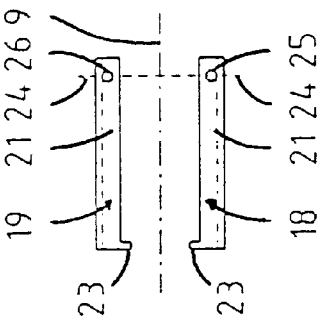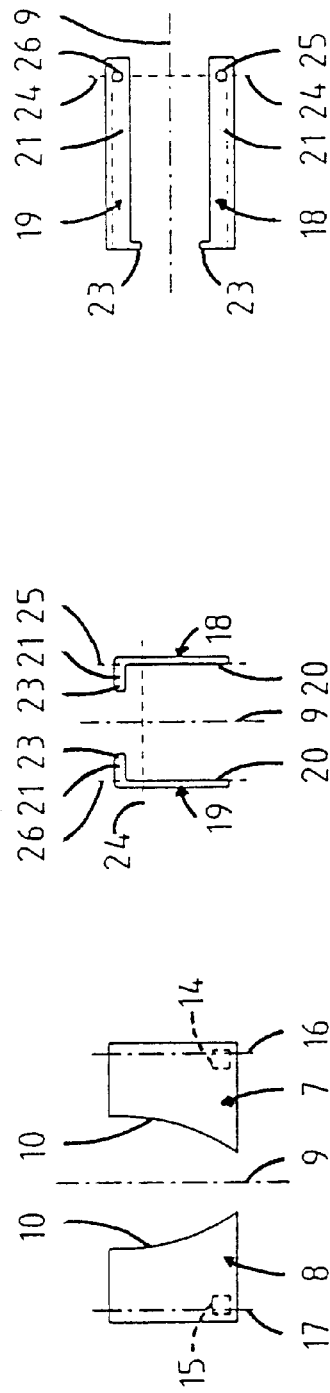

APPARATUS FOR FILLETING THE BREAST PIECE OF A SLAUGHTERED BIRD

BACKGROUND OF THE INVENTION

The present invention relates to an apparatus for filleting the breast piece of a slaughtered bird, the breast piece defined by the keel bone, clavicles, coracoids and the cervical and thoracic vertebrae. Existing device are known comprising an endless revolving conveyor conveying the breast pieces and filleting means located alongside the conveyor for removing the meat from the breast piece.

OBJECTS AND SUMMARY OF THE INVENTION

It is an object of the invention to further optimize existing apparatus for filleting the breast piece of slaughtered poultry. Additional objects and advantages of the invention will be set forth in part in the following description, or may be obvious from the description, or may be learned through practice of the invention.

The apparatus of the invention is characterized in that the filleting means comprise scraping plates positioned at both sides of the track followed by the conveyor and having an operative contour adapted to the shape of part of the breast piece to be processed.

The scraping plates remove the meat from a part of the breast piece to be processed. For removing all meat from the breast piece, a number of pairs of scraping plates positioned at both sides of the conveyor may be applied. During the successive passage of the pairs of scraping plates, the meat is then fully removed from the breast piece.

In accordance with a preferred embodiment of the apparatus, at least scraping plates are provided extending substantially perpendicularly to the longitudinal medial plane of the conveyor and the operative contour of which is substantially adapted to that part of the breast piece extending between the cervical and thoracic vertebrae and the coracoids. By means of said scraping plates, said part of the breast piece is filleted. Thereby the respective meat already may be entirely loosened from the breast piece, but it is possible too that the meat remains connected to the breast piece in the region of the coracoids, and will be entirely loosened while passing subsequent scraping plates.

It is advantageous when the perpendicular to each scraping plate encloses such an angle with the direction of conveyance of the conveyor that the force exerted onto the breast piece to be processed has a downwardly directed component. In this way, the direction of the mentioned force component coincides with the direction of the force of gravity, such that loosening the meat is improved by the force of gravity.

Further, it may be advantageous when each scraping plate is pivotable around a pivot axis directed perpendicularly to the direction of conveyance, yet in parallel with the longitudinal medial plane of the conveyor. As a result, the scraping plates with their operative contour can follow the shape of the breast piece in an optimised manner.

In a constructive way, this can be realized when each scraping plate is pivotable around a pivot axis directed perpendicularly to the direction of conveyance, yet in parallel with the longitudinal medial plane of the conveyor.

Finally, it is possible with this embodiment of the scraping plates that said scraping plates are made of an elastic plastic, such as synthetic rubber or the like. As a result of this, also a good adaption of the operative contour to the shape of the breast piece to be processed is obtained.

As mentioned before, it is possible that the meat which is removed from the breast piece by means of the aforementioned scraping plates remains connected to said breast piece. In such a case, however not limited thereto, it is possible that the apparatus is at least provided with scraping plates extending substantially in parallel with the longitudinal medial plane of the conveyor and the operative contour of which is substantially adapted to the part of the breast piece extending between the coracoids and the keel bone. Using said scraping plates, the remaining part of the meat is loosened from the breast piece to be processed, such that after passing said scraping plates the breast piece is entirely filleted.

In this respect, it is preferred that each scraping plate is provided with an edge portion angled towards the conveyor, as well as an opposite edge enclosing such an angle, with the direction of conveyance of the conveyor so that the force exerted onto the breast piece to be processed has a downwardly directed component. The downwardly directed force component again creates the aforementioned specific advantage. Further the angled edge portion is extremely effective in loosening the meat from the respective part of the breast piece to be processed.

It is further preferred herein that at the end of the angled edge portion which is meant to firstly engage a breast piece to be processed, a projection directed towards the conveyor is provided. In the immediate vicinity of the wing stubs, just about between the coracoids and clavicles, said projection will engage the breast piece and at that location will start with filleting the meat. Said projection improves the initial entrance of the scraping plates into the meat.

In such a case, it further may be advantageous when the scraping plates are in a spring-loaded manner pivotable around a pivot axis directed perpendicularly to the longitudinal medial plane of the conveyor. As a result of these measures, also an optimized adaptation of the position of the scraping plates to the shape of the breast piece to be processed may occur.

Although it is possible that the apparatus of the invention comprises only scraping plates which substantially are positioned perpendicularly to the longitudinal medial plane of the conveyor or comprises only scraping plates which substantially extend in parallel to the longitudinal medial plane of the conveyor, most times the apparatus of the invention will comprise both types of scraping plates.

Hereinafter the invention will be explained with reference to the drawings, in which an embodiment of the apparatus of the invention is illustrated.

BRIEF DESCRIPTION OF THE DRAWINGS

FIG. 1 shows, in an elevated side view, part of an embodiment of the apparatus of the invention;

FIG. 2 shows a view according to II—II in FIG. 1;

FIG. 3 shows a view according to III—III in FIG. 1, and

FIG. 4 shows a view according to IV in FIG. 1.

DETAILED DESCRIPTION

Reference will now be made in detail to the presently preferred embodiments of the invention, one or more examples of which are illustrated in the figures. Each example is provided by way of explanation of the invention, and not meant as a limitation of the invention. For example, features illustrated or described as part of one embodiment can be used with another embodiment to yield still a third embodiment. It is intended that the invention include such modifications and variations.

FIG. 1 shows a carriage 1 receiving a so-called breast piece 2. Principally the breast piece 2 is defined by the keel bone 3, the clavicles 4, the coracoids 5, and the cervical and thoracic vertebrae 6. Of course these parts are surrounded by meat.

The carriage 1 (together with a large number of other carriages not illustrated) belongs to a conveyor (not illustrated) and follows an endless revolving track defined thereby. During following of said track, the carriages 1 with breast piece 2 positioned thereon pass filleting means positioned alongside the conveyor for removing the meat from the breast piece. Hereinafter, said filleting means will be discussed in detail.

Among these filleting means are scraping plates 7 and 8 which substantially are positioned perpendicularly to the longitudinal medial plane 9 (see FIG. 2) of the conveyor. The operative contour 10 of said scraping plates 7 and 8 substantially is adapted to that part of the breast piece extending between the cervical and thoracic vertebrae 6 and the coracoids 5 (in FIG. 1 the part of the breast piece 2 above the dotted line 11).

As is shown in FIG. 1, the perpendicular 12 to the scraping plates 7 and 8 encloses an angle with the direction of conveyance 13 of the conveyor. Said angle is such that the force exerted onto the breast piece 2 to be processed comprises a downwardly directed component. Because, in the position illustrated in FIG. 1, the breast piece 2 is supported from the carriage 1 upside down, said downwardly directed component has the same direction as the force of gravity. As a result the loosening action or filleting action of the scraping plates 7 and 8 is advantageously improved by the force of gravity.

The scraping plates 7 and 8 are positioned at the end of arms 14 and 15 which are pivotable around pivot axes 16 and 17 (which on one hand extend in parallel to the longitudinal medial plane 9 and on the other hand extend perpendicularly to the direction of conveyance 13 of the conveyor).

Using the scraping plates 7 and 8, the meat of the part above the dotted line 11 is loosened from the breast piece 2. Hereby, the meat most times will remain connected to the meat of the lowermost part of the breast piece 2; however, this is not necessary.

The apparatus further comprises scraping plates 18 and 19 which, as seen in the direction of conveyance 13, are positioned behind the scraping plates 7 and 8. The operative contour 20 (see FIG. 3) of the scraping plates 18 and 19 mainly is adapted to that part of the breast piece 2 extending between the coracoids 5 and the keel bone 3 (in FIG. 1 the part below the dotted line 11).

The scraping plates 18 and 19 each are provided with an edge portion 21 (FIG. 3) angled towards the conveyor and an opposite edge 22 (FIG. 1) which again encloses such an angle with the direction of conveyance 13 of the conveyor that the force exerted onto the breast piece 2 to be processed comprises a downwardly directed component.

At its end meant for firstly engaging the breast piece 2 to be processed, the angled edge portion 21 comprises a projection 23 directed towards the conveyor (or its longitudinal medial plane 9). Said projection 23 is meant for engaging the breast piece at the wing stub between the coracoids 5 and clavicles 4 and for starting filleting the meat at that location.

In the illustrated embodiment, the scraping plates 18 and 19 are pivotable around a pivot axis 24 directed perpendicularly to the longitudinal medial plane 9 of the conveyor. The plates 18 and 19 may be spring-loaded with a spring force that may be settable.

Further it is possible that the scraping plates 18 and 19 are pivotable around a vertical axis 25 or 26, respectively, in a controlled manner. This is already known per se. As a result of both possibilities of movement of the scraping plates 18 and 19, these can adopt themselves optimally to the shape of the passing breast piece 2.

The invention is not limited to the embodiment described before which can be varied widely within the scope of the invention as defined by the claims.

I claim:

1. An automated apparatus for filleting a breast piece of a slaughtered bird wherein the breast piece is defined by the keel bone, clavicles, coracoids, and cervical and thoracic vertebrae, said apparatus comprising:

a carriage device for conveying the breast piece on a conveyor; and at least two sets of scraping plates disposed on opposite sides of said conveyor, wherein a first set of scraping plates comprise edges disposed to contact and fillet a first part of said breast piece, said plates having a contour adapted to the shape of said first part of the breast piece, wherein a second set of scraping plates comprise edges disposed to contact and fillet a second part of said breast piece, said plates having a contour adapted to the shape of said second part of the breast piece; and wherein one said set of scraping plates extend generally perpendicular to a longitudinal axis of said conveyor with edges having a contour adapted to a part of the breast piece between the cervical and thoracic vertebrae and the coracoids.

2. The apparatus as in claim 1, wherein one of said sets of scraping plates is disposed to filet a part of the breast piece between the cervical and thoracic vertebrae and the coracoids, and said other set of scraping plates is disposed to filet a part of the breast piece between the coracoids and the keel bone.

3. The apparatus as in claim 1, wherein said scraping plates are disposed at an angle with respect to a line of conveyance of said conveyor so that a downwardly directed force is exerted on the breast piece by said scraping plates as the breast piece is conveyed there past.

4. The apparatus as in claim 1, wherein said scraping plates are movable around a pivot axis in a direction away from said conveyor.

5. The apparatus as in claim 4 wherein said scraping plates are spring loaded.

6. The apparatus as in claim 1, wherein said scraping plates are pivotable around a pivot axis that is generally perpendicular to a conveying direction of said conveyor and extends in a plane generally parallel to said conveying direction of said conveyor.

7. The apparatus as in claim 1, wherein said scraping plates are formed of an elastic material.

8. The apparatus as in claim 1, wherein one set of scraping plates extend generally in parallel to a longitudinal axis of said conveyor with edges having a contour adapted to a part of the breast piece extending between the coracoids and the keel bone.

9. The apparatus as in claim 8, wherein said edges of said scraping plates disposed to contact and filet the breast piece are angled with respect to a line of conveyance of said conveyor so that a downwardly directed force is exerted on the breast piece by said scraping plates as the breast piece is conveyed there past.

10. The apparatus as in claim 9, wherein said scraping plates comprise a forward edge disposed to firstly engage the breast piece before said angled edge, said forward edge having a projection disposed thereon to firstly engage and start fileting of the breast piece before engagement of said angled edge.

* * * * *